United States Patent [19]

Zalesak et al.

[11] Patent Number: 4,493,195

[45] Date of Patent: Jan. 15, 1985

[54] AIR CONDITIONING SYSTEM WITH EVAPORATIVE COOLING APPARATUS

[75] Inventors: Philip F. Zalesak, Waldorf; Ronald D. Moore, Lusby, both of Md.

[73] Assignee: The United States of America as represented by the Secretary of the Navy, Washington, D.C.

[21] Appl. No.: 493,461

[22] Filed: May 11, 1983

[51] Int. Cl.³ .............................................. F25D 9/00
[52] U.S. Cl. ........................................ 62/402; 62/91; 62/121; 62/304
[58] Field of Search ............... 62/91, 93, 401, 402, 62/121, 304

[56] References Cited

U.S. PATENT DOCUMENTS

| | | | |
|---|---|---|---|
| 2,628,481 | 2/1953 | Scofield et al. | 62/402 |
| 2,721,456 | 10/1955 | Whitney, Jr. et al. | 62/402 |
| 2,730,874 | 1/1956 | Schelp | 62/91 |
| 2,835,340 | 5/1958 | McGuff | 62/93 |
| 3,587,243 | 6/1971 | Keller et al. | 62/402 |
| 3,623,332 | 11/1971 | Fernandes | 62/402 |
| 3,878,692 | 4/1975 | Steves | 62/402 |
| 4,003,212 | 1/1977 | Kinsell et al. | 62/91 |
| 4,015,438 | 4/1977 | Kinsell et al. | 62/91 |
| 4,018,060 | 4/1977 | Kinsell et al. | 62/91 |
| 4,312,191 | 1/1982 | Biagini | 62/402 |
| 4,334,411 | 6/1982 | Payne | 62/402 |
| 4,374,469 | 2/1983 | Rannenberg | 62/402 |

Primary Examiner—Ronald C. Capossela
Attorney, Agent, or Firm—Robert F. Beers; Arthur L. Branning

[57] ABSTRACT

An air conditioning system with incorporated evaporative cooling apparatus adapted to sequentially pass compressed air from a compressor through a heat exchanger and expansion cooling turbine and into an enclosure. A condensate extractor is interposed downstream of the expansion cooling turbine and located above the heat exchanger. A nozzle is mounted to the heat exchanger and connected via a water conduit to the condensate extractor so that gravity delivers extracted condensate to the nozzle. The nozzle communicates via an air conduit with the compressor so that compressed air disperses the extracted condensate through the nozzle to impinge upon the heat exchanger thereby effectuating evaporative cooling.

5 Claims, 3 Drawing Figures

AIR CONDITIONING SYSTEM WITH EVAPORATIVE COOLING APPARATUS

BACKGROUND OF THE INVENTION

This invention relates generally to air conditioning and more particularly to an air-cycle, air conditioning system incorporating evaporative cooling apparatus.

Air conditioning systems for vehicles are basically two types. One is the closed-loop, vapor cycle which is commonly used in automobiles. This type of system is undesirable for use in an aircraft because of high component weight and substantial power requirements which may, in some cases, produce unsafe conditions. The other is the air-cycle, air conditioning system which has been recognized by the art as the preferred aircraft air conditioning system.

An air-cycle, air conditioning system is generally comprised of a compressor, an air-to-air heat exchanger, and an expansion cooling turbine; all of which are series interconnected. The heat exchanger includes two flow paths one of which is arranged to received compressed air from the compressor and the other is arranged to receive ram air(i.e., atmospheric air compressed by the forward motion of the aircraft). The purpose of the ram air is to withdraw heat given up to the heat exchanger by the compressed air. The turbine then further cools the compressed air and finally discharges it into the enclosure of the aircraft substantially reduced in both temprature and pressure.

A problem associated with employing ram air as a heat exchanger coolant is that at high aircraft speeds skin friction causes significant increases in the immediate air temperature. The hotter air is a poorer heat sink to the air being conditioned in the heat exchanger. However loss of an adequate heat sink for the system can be offset by impinging condensate extracted from the system upon the heat exchanger thereby effectuating evaporative cooling. Similarly, a further problem of aircraft drag attributable to the quantity of ram air that must be ingested to provide heat sinking is likewise alleviated by auxiliary evaporative cooling.

U.S. Pat. No. 4,018,060 issued to Kinsell et al. discloses an air-cycle, air conditioning system incorporating auxiliary evaporative cooling apparatus to impinge extracted condensate on a heat exchanger. A power source, which is independent of the air conditioning system, transports and disperses extracted condensate by creating a pressure differential between the point of condensate extraction and the point of condensate dispersion. A disadvantage in relying on an independent power source is that any impairment in the power source likewise adversely affects the apparatus' ability to provide evpaorative cooling. Also, small breaks or openings along the condensate's transportation path would decrease the pressure differential, and thus the transporting capability.

SUMMARY OF THE INVENTION

The instant invention embodies an air-cycle, air conditioning system wherein auxiliary evaporative cooling is provided by condensate extracted from the system and then transported by gravity. The condensate is transported downward via a conduit to a nozzle. The nozzle communicates with a compressor in the air conditioning system to inject the condensate for impingement upon the heat exchanger, thereby effectuating evaporative cooling.

An object of the present invention is to incorporate a simple and reliable evaporative cooling apparatus into an air-cycle, air conditioning system.

A further object is to transport and disperse extracted condensate from an evaporative cooling apparatus independent on any power source other than that provided by the air conditioning system.

A still further object is to provide an evaporative cooling apparatus which will be free of significant impairment in the event relatively small openings or breaks develop along the condensates' transportation path.

These and other objects of the present invention will be apparent upon reference to the accompanying description when taken in conjunction with the following drawings:

DETAILED DESCRIPTION OF THE INVENTION

FIG. 3 depicts an air conditioning system with an evaporative cooling apparatus that utilizes two spray nozzles.

Figure 1:
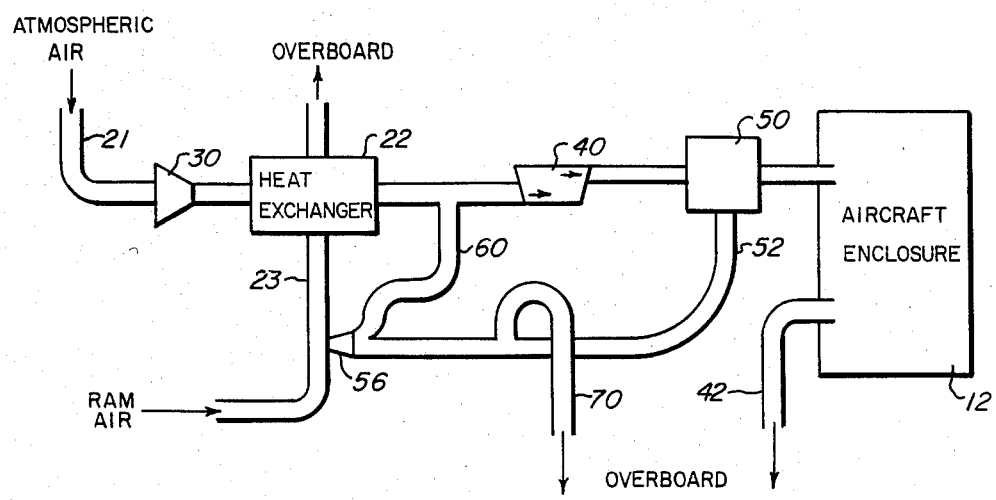
FIG. 1 depicts the air-cycle, air conditioning system with evaporative cooling apparatus.

The air-cycle, air conditioning system with incorporated evaporative cooling apparatus is schematically illustrated in FIG. 1. In general, the system includes evaporative cooling apparatus and cooling apparatus comprising a compressor 30, a heat exchanger 22, and an expansion cooling turbine 40. Atmospheric air is indicated as surrounding the entire system.

In operation, a compressor 30 is arranged to draw atmospheric air via an inlet duct 21. The compressor compresses the air which, as is well known, results in an increase in air temperature. The air is then discharged from the compressor 30 through a first flow path of an air-to-air heat exchanger 22 for giving up heat thereto. Ram air is then directed via a ram air duct 23 through a second flow path of the heat exchanger 22. The ram air withdraws heat given up to the heat exchanger 22 and then returns to the atmosphere.

The partially cooled air exits from the first flow path of the heat exchanger 22 to incident upon an expansion cooling turbine 40. The air releases energy in rotating the turbine which, as is well known, results in a substantial reduction of both the temperature and pressure in the air. As a result of the cooling and decompression of the air, entrained moisture condenses and is extracted by condensate extractor 50. The cooled air, then significantly free of moisture, is finally ducted into the aircraft enclosure 12. Enclosure air can be exited via a duct 42.

The condensate extractor 50 is mounted above said heat exchanger and downstream of the turbine 40 to receive the cooled, decompressed air and extract the condensate therefrom. The condensate extractor may be selected from any number of commercially available condensate extraction equipment. A nozzle 56 is disposed beneath the condensate extractor 50 and, through a water conduit 52, communicates therewith. The water conduit 52 is arranged so that the condensate is downwardly delivered to the nozzle by gravity actuation. The nozzle 56 is mounted to inject the condensate into the ram air entering the heat exchanger 22. In order to inject the condensate, the nozzle 56 communicates with compressed air from the air compressor 30. One end of air conduit 60 connects to the nozzle 56 and the other end is located downstream of the compressor 30. The latter end is both outwardly flared to receive the compressed air and cross-sectionally centered in the flow of compressed air.

A plurality of nozzles, shown in FIG. 3, would be employed if there is a sufficient quantity of compressed air and extracted condensate available. If more than one nozzle is employed, an air manifold would connect the air conduit 60 to each of the nozzles. Similarly, a water manifold would connect the water conduit 52 to each of the nozzles.

A drain conduit 70 is mounted on one end of the water conduit 52 to provide for a condensate overflow only in the event that the condensate flow becomes blocked. The exit end of the drain conduit 70 may be any suitable place for discharging the water.

Each of the elements of the system should be of suitable material to resist corrosion. The bonding between the elements should be water tight where condensate is transported or air tight where air is transported.

Figure 2:
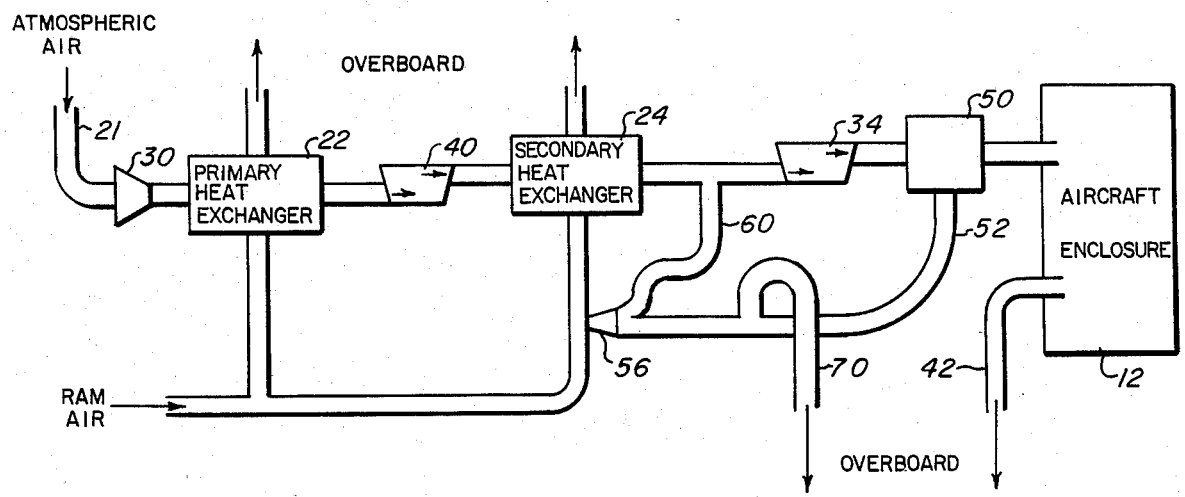
FIG. 2 depicts a variation of the air-cycle, air conditioning system with evaporative cooling apparatus.

Reference is now made FIG. 2 which schematically illustrates a variation of an air-cycle air conditioning system with incorporated evaporative cooling. This variation includes a second heat exchanger 24 and a second turbine 34. The system is illustrated as providing auxiliary evaporative cooling to the second heat exchanger 24 but it otherwise operates in the same manner and includes all the same embodiments as described in FIG. 1.

Although the invention has been illustrated and described with the particular embodiments illustrated, it will be apparent to those skilled in the art that various changes may be made therein without departing from the spirit of the invention as set forth in the appended claims.

What is claimed is:

1. An air-cycle, air conditioning system for an enclosure having a compressor arranged to sequentially pass compressed air through a heat exchanger for partially cooling the compressed air and then to an expansion cooling turbine for decompressing and further cooling the same for discharge into the enclosure; wherein the improvement comprises:
   a condensate extractor interposed downstream of said expansion cooling turbine and disposed above said heat exchanger to provide gravity actuation of extracted condensate;
   a nozzle disposed beneath the condensate extractor to receive the condensate and direct it to impinge upon said heat exchanger thereby providing auxiliary evaporative cooling;
   a water conduit connecting said nozzle to said condensate extractor for transporting the condensate therethrough; and
   an air conduit through which said nozzle communicates with said compressor to receive compressed air for dispersing the condensate.

2. The improvement as claimed in claim 1, wherein the end of said air conduit which communicates with said compressor is outwardly flared to receive the flow of compressed air.

3. The improvement as claimed in claim 2, wherein the end of said air conduit is cross-sectionally centered in the flow of compressed air.

4. The improvement as claimed in claim 1, further comprising
   at least one additional nozzle disposed beneath said condensate extractor to receive the condensate and direct it to impinge upon said heat exchanger;
   an air manifold connecting said nozzles and said air conduit; and
   a water manifold connecting said nozzles to said water conduit.

5. The improvement as claimed in claim 4, further comprising a drain conduit mounted to said water conduit for providing a condensate overflow.

* * * * *